US009932813B2

United States Patent
Haq et al.

(10) Patent No.: US 9,932,813 B2
(45) Date of Patent: Apr. 3, 2018

(54) METHOD AND SYSTEM FOR PERFORMING FRICTION FACTOR CALIBRATION

(71) Applicant: LANDMARK GRAPHICS CORPORATION, Houston, TX (US)

(72) Inventors: Nadeem A. Haq, Richmond, TX (US); Gustavo A. Urdaneta, Houston, TX (US); Robello Samuel, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 309 days.

(21) Appl. No.: 14/765,831

(22) PCT Filed: Feb. 27, 2013

(86) PCT No.: PCT/US2013/028052
§ 371 (c)(1),
(2) Date: Aug. 4, 2015

(87) PCT Pub. No.: WO2014/133505
PCT Pub. Date: Sep. 4, 2014

(65) Prior Publication Data
US 2015/0361779 A1 Dec. 17, 2015

(51) Int. Cl.
*E21B 3/00* (2006.01)
*E21B 44/00* (2006.01)
*E21B 47/00* (2012.01)
(52) U.S. Cl.
CPC ............... *E21B 47/00* (2013.01); *E21B 3/00* (2013.01); *E21B 44/00* (2013.01)

(58) Field of Classification Search
CPC ............. E21B 3/00; E21B 44/00; E21B 47/00
See application file for complete search history.

(56) References Cited

U.S. PATENT DOCUMENTS 4,549,431 A 10/1985 Soeiinah
4,972,703 A 11/1990 Ho
(Continued)

FOREIGN PATENT DOCUMENTS

WO WO-2013000094 A1 1/2013

OTHER PUBLICATIONS

Chris Lenamond, A Graphical Hole Monitoring Technique to Improve Drilling in High-Angle and Inclined Deepwater Wells in Real-Time, Apr. 1-3, 2003, 15 pages, AADE-03-NTCE-24, AADE 2003 National Technology Conference, Houston, Texas.
(Continued)

*Primary Examiner* — Bryan Bui

(57) ABSTRACT

Calibrating Friction Factors. At least some of the illustrative embodiments are methods including: calibrating friction factor for a drilling operation by: plotting on a display device the expected hook load versus depth for the drilling operation; displaying plot points on the display device, each plot point indicative of a measured hook load versus depth for the drilling operation; selecting a plot point associated with a depth, the selecting responsive to a cursor hovering over the plot point on the display device; displaying a friction factor values which correlates the expected hook load versus depth for the particular depth to the measured hook load versus depth for the plot point, selecting the value responsive to the cursor hovering over the value; and then shifting on the display device at least a portion of the indication of expected hook load versus depth based on the value of friction factor.

14 Claims, 7 Drawing Sheets

(56) References Cited

U.S. PATENT DOCUMENTS

| | | |
|---|---|---|
| 7,530,393 B2 | 5/2009 | Wood et al. |
| 7,962,288 B2 | 6/2011 | Gleitman |
| 2004/0182606 A1 | 9/2004 | Goldman et al. |
| 2014/0196949 A1* | 7/2014 | Hareland ............... E21B 44/00 175/27 |
| 2015/0012253 A1* | 1/2015 | O'Donnell ............ E21B 17/00 703/2 |

OTHER PUBLICATIONS

Richard Kucs, Hermann F. Spörker, Gerhard Thonhauser and Philipp Zoellner, Automated Real Time Hookload and Torque Monitoring, Mar. 4-6, 2008, 14 pages, IADC/SPE 112565, IADC/SPE Drilling Conference, Orlando, Florida.
M.Niedermayr, J.Pearse, M.Banks, G. Thonhauser and P. Zoellner, Case Study—Field Implementation of Automated Torque-and-Drag Monitoring for Maari Field Development, Feb. 2-4, 2010, 14 pages, IADC/SPE 128243-PP, IADC/SPE Drilling Conference and Exhibition, New Orleans, Louisiana.
Mohammad Fazaelizadeh, Geir Hareland and Bernt S. Aadnoy, Application of New 3-D Analytical Model for Directional Wellbore Friction, Modern Applied Science, Feb. 2010, 21 pages, vol. 4, No. 2, Canadian Center of Science and Education, Canada.
S. Hammad Zafar and Brenda Slaney, Screening Tool for Rotary Steerable Candidate Selection, Apr. 10-12, 2007, 12 pages, AADE-07-NTCE-50, 2007 AADE National Technical Conference and Exhibition, Houston, Texas.
International Search Report and Written Opinion, dated Oct. 10, 2013, 11 pages; Korean International Searching Authority.

\* cited by examiner

METHOD AND SYSTEM FOR PERFORMING FRICTION FACTOR CALIBRATION

CROSS-REFERENCE TO RELATED APPLICATIONS

This application is a U.S. National Stage patent application of International Patent Application No. PCT/US2013/028052, filed on Feb. 27, 2013, the benefit of which is claimed and the disclosure of which is incorporated herein by reference in its entirety.

BACKGROUND

In torque and drag calculations, the actual values measured of hook load versus measured depth may not closely correspond to the values expected as the drill string moves farther into a borehole. For each hole section, trial and error calculations of friction factor combinations may be made in order to ascertain an acceptable friction faction for each hole section adequately matching the actual loads and data results. However, trial and error calculations are laborious and prone to human error and thus any method to calculate friction factors quicker and with less error would be advantageous.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Pointer cursor" shall mean a graphics object shown on a display device where the graphics object moves on the screen responsive to movement of a pointer device, such as a mouse or a touch pad.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The specification first turns to a high level overview. Well planning software may be used to display a plurality of hook load and depth values on a plotted graph displayed on a user interface. The plotted values may be individual plot points and/or may be trend lines representative of actual measured values, as well as representative of expected hook load and measured depth values. A user may interact with the plotted values displayed on the user interface in order to calibrate the friction factors associated with the expected hook load and measured depth values in such a way that the expected values more closely align with the actual measured values. More specifically, the friction factor values used during the planning of a borehole may be calibrated based on the selection of actual values measured during the creation of the borehole. A more detailed overview of the software is shown in FIG. 1.

Figure 1:
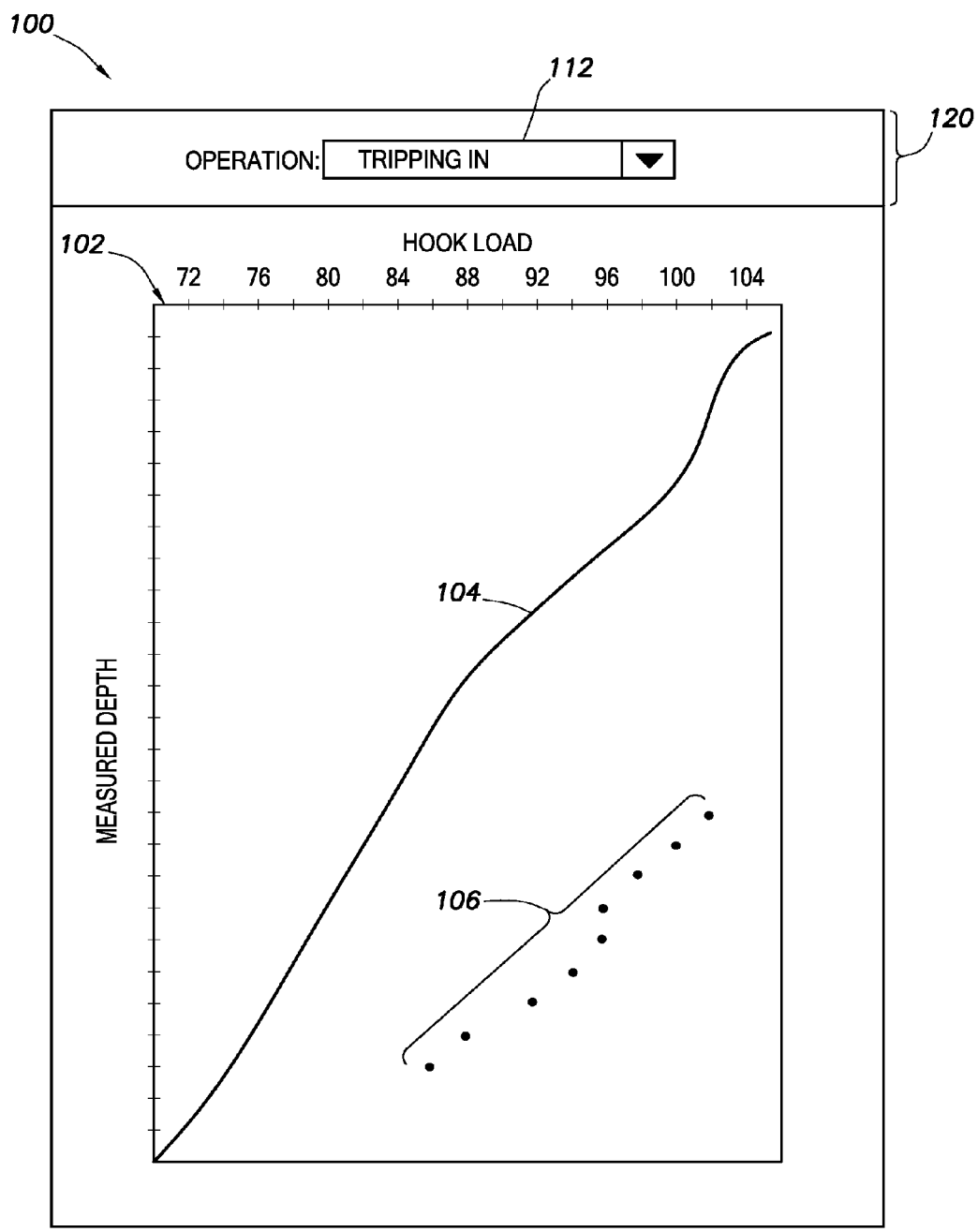
FIG. 1 shows a user interface in accordance with at least some embodiments.

FIG. 1 shows a user interface in accordance with at least some embodiments. In particular, FIG. 1 shows a portion of a user interface 100 which may be displayed on a display device of a computer system, such as an external monitor or a tablet screen. In one embodiment, user interface 100 comprises a top portion 120, in which a drop down menu 112 of possible drilling operations for which the friction factor calibration will be performed may reside. In particular, the user may interact with drop down menu 112 by selecting one of a plurality of operating conditions such as, but not limited to, tripping in, tripping out, and rotating off bottom. The specific operation selected by the user from drop down menu 112 provides the data that may be used in order to arrive at the proper correlated friction factors values for the selected operation.

In addition, user interface 100 also comprises a graph 102, in which a plurality of hook load versus measured depth values may be plotted. Drilling reports and surveys may provide actual measured hook loads and depth values for tripping in, tripping out, and rotating off bottom. Torque and drag calculations may be later used to predict expected hook load and depth values for each operation. Subsequently, actual measured hook loads and depth values may be used in order to perform a friction factor calibration on the expected hook load and depth values.

In particular, graph 102 shows an expected hook load versus measured depth line 104 for an example tripping-in operation for a set of expected friction factor values. The expected hook load versus measured depth line 104 varies depending on the operation selected in drop down menu 112, as well as previously gathered data or real-time data related to the specific operation. In addition, graph 102 shows a plurality of values representing actual measured hook load versus depth values 106. In FIG. 1, the actual measured hook load versus depth values 106 are representative of the tripping-in operation selected in drop down menu 112, but as with the expected hook load versus measured depth line 104, the actual values vary based on the operation selected, as well as previously gathered data or real-time data related to the specific operation. In order to perform friction factor calibrations, a user interacts on the user interface 100 by selecting a plurality of options. By interacting with the user interface 100, a user may calibrate the friction factors by adjusting the friction factors in such a way that line 104 more closely matches the actually measured values 106. Stated otherwise, FIG. 1 shows a situation prior to calibration of the friction factors.

Figure 2:
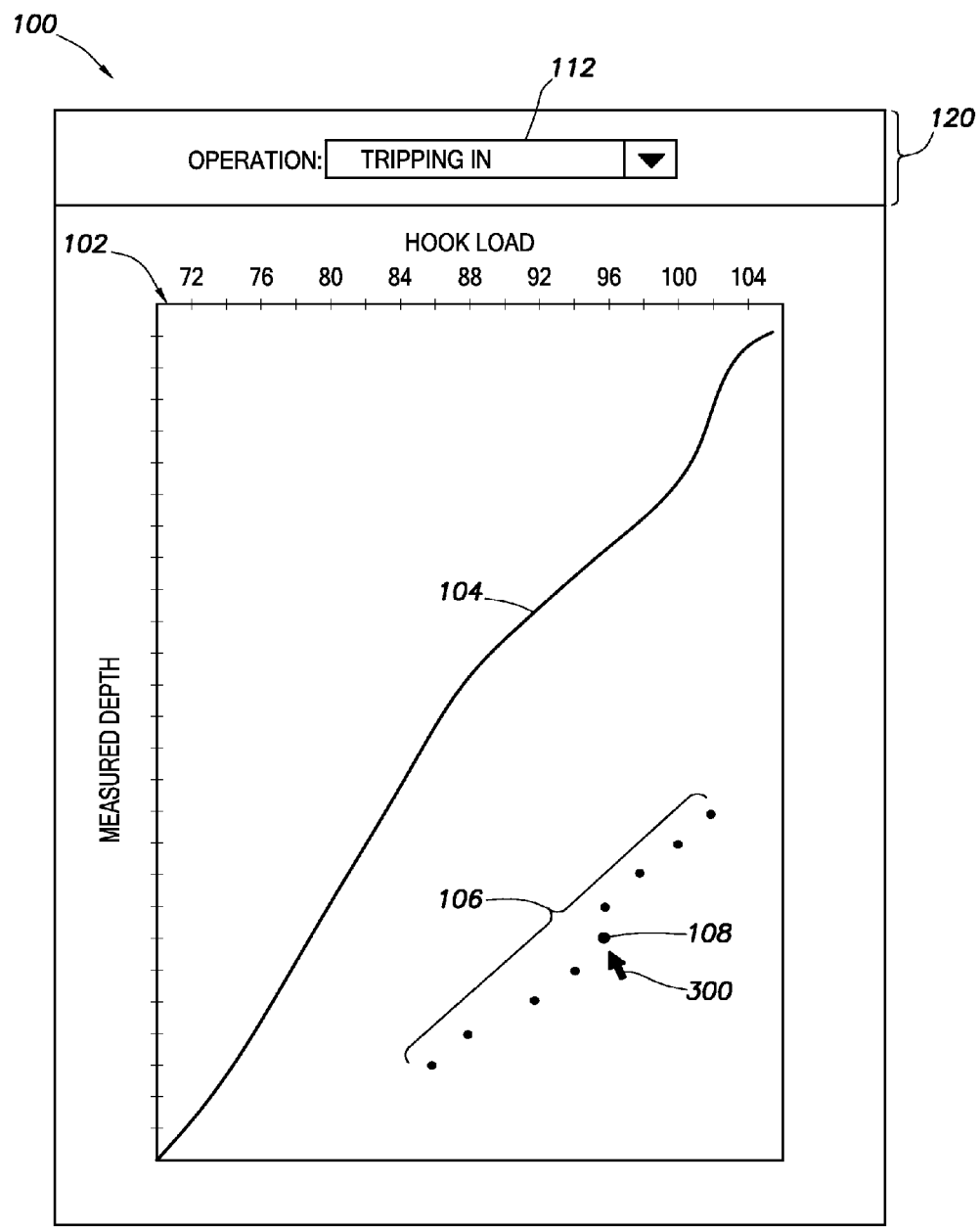
FIG. 2 shows a user interface in accordance with at least some embodiments.

FIG. 2 shows a user interface in accordance with at least some embodiments. In particular, FIG. 2 shows the expected hook load versus measured depth line 104, as well as the plurality of actual measured hook load versus depth values 106. In addition, a pointer cursor 300 is shown. Pointer cursor 300 may be any graphics object shown on a display device that moves responsive to the movement of a pointing device, such as a mouse, directional keys on a keyboard, a user's finger or stylus gestures on a touchscreen, or movement of a user's hands in a virtual reality setting.

In order to interact with portions of user interface 100, the user moves the pointer cursor 300 to "hover-over" a location on the user interface 100 which corresponds to the desired selectable item. For example, a user may move pointer cursor 300 to hover-over actual measured hook load versus depth point 108. In FIG. 2, the user has not yet brought the pointer cursor 300 close enough to point 108 in order to select it, however, the result of selecting point 108 with pointer cursor 300 is shown in FIG. 3.

Figure 3:
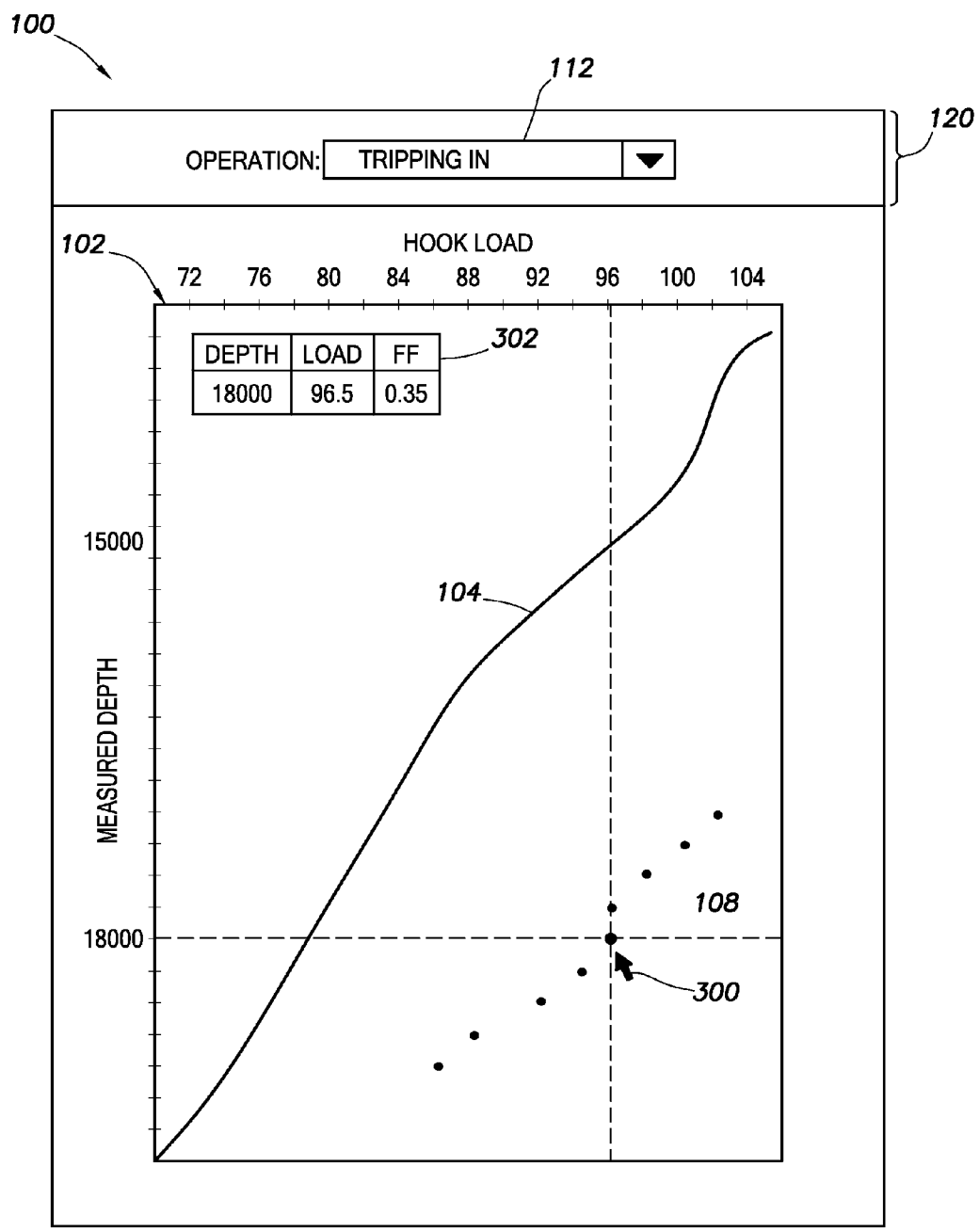
FIG. 3 shows a user interface in accordance with at least some embodiments.

FIG. 3 shows a user interface in accordance with at least some embodiments. In particular, FIG. 3 shows a situation where the user has brought the pointer cursor 300 close enough to point 108 to result in a selection of the point. In one embodiment, the user may need only to place the pointer cursor within a certain predetermined distance on the display device of a selectable item in order to select it, while in another embodiment, the user may need to place the pointer cursor within a certain predetermined distance of a selectable item and then perform an action to select the item, such engaging an action button on a mouse, pressing a specific key on a keyboard, or double tapping a touch screen.

When point 108 is selected by the user, the computer system calculates a friction factor for the selected point 108 based on the actual measured depth and the actual measured hook load. The calculated friction factor of selected point 108 is displayed on the user interface 100. In one embodiment, the actual measured depth, actual measured hook load, and the calculated friction factor is displayed in a data box 302 overlaid on graph 102. In the example of FIG. 3, the user selected point 108 and the computer system determined that the measured depth of point 108 is 18000 feet, the hook load is 96.5 kips, and the calculated friction factor is 0.35. These values are examples and are not necessarily indicative of actual measured or calculated values. Once the computer system determines and calculates the data which populates data box 302, the user may interact with the data box 302 to select the friction factor (if desired). In particular, the user may select the calculated friction factor in data box 302 the same way the user selects a point on the user interface 100—by moving the pointer cursor 300 near the desired friction factor value and selecting it by either clicking a mouse button, double tapping a touchscreen, or by engaging a key on a keyboard. Based the friction factor selected in the data box 302, the corresponding friction factor used with respect to the expected hook load versus measured depth line 104 is replaced with the selected friction factor, and thus the friction factor is "calibrated."

Figure 4:
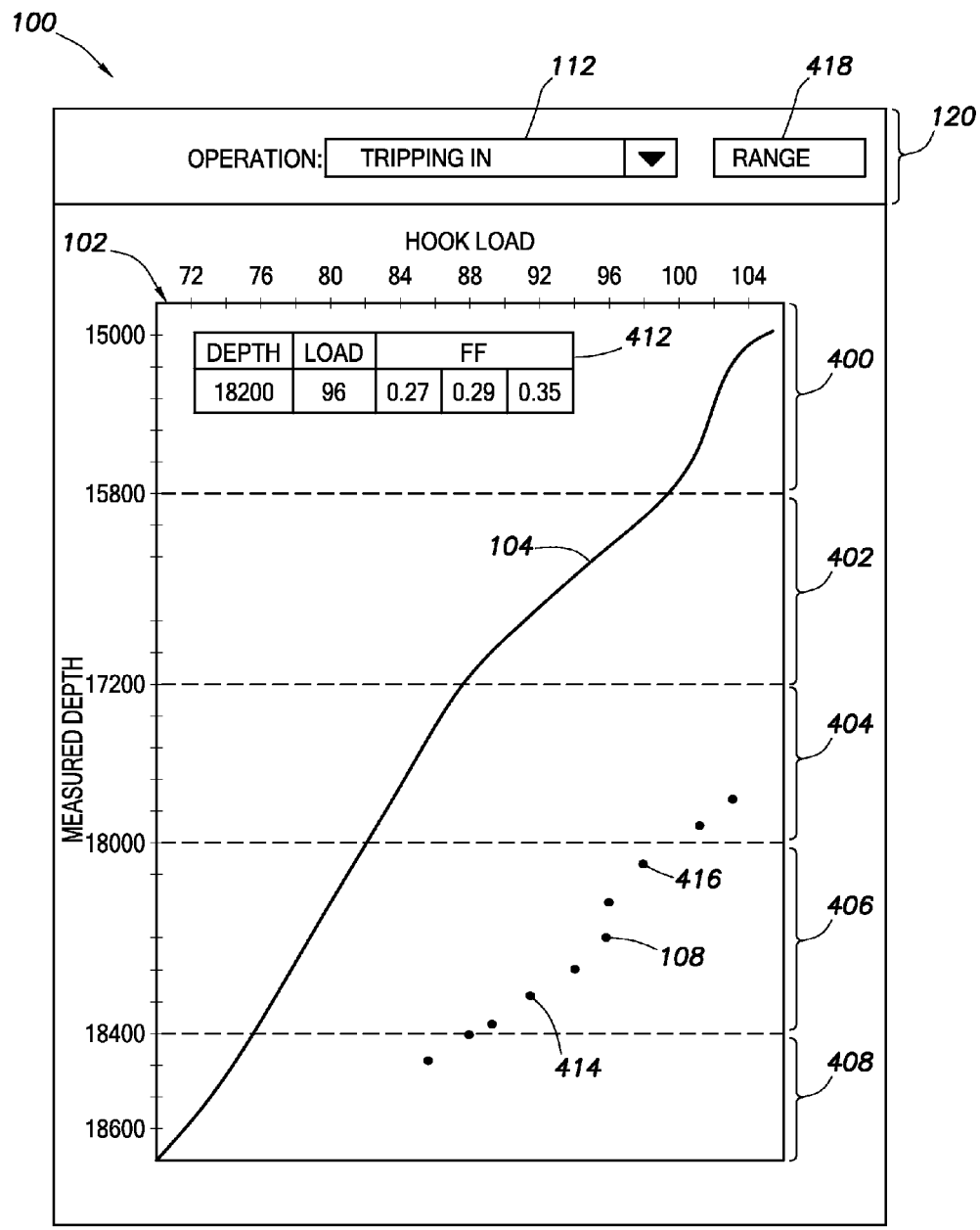
FIG. 4 shows a user interface in accordance with at least some embodiments.

While the user may select any single point from the actual measured hook load versus depth values 106 on the graph 102, it may also be possible for the user to select a range of values, where each value in the range correlates the expected hook load versus depth values along a range of measured depth and hook load values, as is shown in FIG. 4.

FIG. 4 shows a user interface in accordance with some embodiments. In particular, FIG. 4 shows many of the same elements of FIG. 3; however, in FIG. 4, graph 102 is divided into sections. In particular, FIG. 4 shows five measured depth sections 400, 402, 404, 406, and 408. These sections may correspond to various logical sections of a planned, partially drilled, or fully drilled borehole, such as the spud section, a vertical cased portion, a vertical non-cased portion, and a deviated portion. In the example shown in FIG. 4, a range button 120 is present in top portion 120. If the user selects the range button 120 (by any suitable means), the range sections of the graph 102 may be shown, and the user may select any of the ranges in order to calibrate the friction factor within that range. In one embodiment, with the range sections shown, the selection may be made by selecting a single point within the range. In another embodiment, it may be possible to select all the points within a range by selecting a portion of the user interface 100 corresponding to that range, such as a section to the right of graph 102. In another embodiment, the selection may be made by "clicking and dragging" the pointer cursor in such a way that a selection box is drawn around a set of selectable points. In another embodiment, a range may be selected by selecting a first point, and then selecting a second point, where the range is then bounded by the depths associated with the points.

In the example of FIG. 4, the user has selected (by any suitable means) the values corresponding to measured depth section 406. Responsive to the selection of a range, the computer system calculates a range of friction factors corresponding to the actual measured value of hook load within the range. In the example of FIG. 4, for a depth range of 18200 feet and a hook load of 96 kips within the range, the three friction values (0.27, 0.29 and 0.35) are calculated and displayed. In this example, three friction factors are illustratively shown and may correspond to the friction factors of points 414, 108, and 416 respectively. Once the user makes a selection of one of the three illustrative friction factors, the computer system calibrates the friction factor of the corresponding portion of expected hook load versus measured depth line 104. More specifically, if the user selects friction factor 0.35 for range 406, the portion of expected hook load versus measured depth line 104 within range 406 will be calibrated with a friction factor of 0.35. While the example of FIG. 4 shows three friction factors values as the range of friction factors, two or more such friction factors may be calculated and displayed. For example, in some cases a friction factor may be calculated for each and every point in the group of actual measured hook load versus depth values 106 within the selected range. In another example system, the computer system may calculate a friction factor for points on the outer edges of the range (e.g., 416 and 414), and then also calculate a predetermined number of friction factor values falling between.

Though not specifically illustrated by FIG. 4, the computer system may also present a single friction factor value for the selected range, in which case the text box would be similar to that shown in FIG. 3. In particular, the user may select a range of values, and the computer system may then calculate a single friction factor value for that range based on any suitable criteria. For example, the single value of the friction factor to be applied for the depth range may be the largest of a plurality of friction factor values calculated (one each for each point 106 in the depth range). In another example, the computer system may select a single value of the friction factor based on the mean value of the friction factors for the range, the average value of the friction factors within the range, or the center value of the friction factors within the range.

Before continuing, it should be noted that the user may select any selectable item displayed on user interface 100 and on graph 102, but in some embodiments, not all items displayed are able to be selected. Non-selectable items may be non-selectable for a variety of reasons. For example, if a user selects a plurality of points to represent a range, but attempts to subsequently select a point falling outside a valid range, the point falling outside may be grayed out and not selectable. If a point is non-selectable, when the pointer cursor 300 is placed over the point, the computer system will not make any determination as to the measured depth or hook load of the point, nor will the computer system calculate a friction factor for the point. Rather, when the pointer cursor 300 hovers over a non-selectable point, the computer system reacts as if the pointer cursor is in a dead zone; in other words, a non-interactive area of the user interface 100.

In summary, regardless of whether one actual measured hook load versus depth point is selected or a range of actual measured hook load versus depth points are selected, the computer system calculates one or more friction factors, and the user may select a friction factor to be applied to the expected hook load versus measured depth line 104 either as a whole, or within a depth range. The result of "calibrating" the one or more friction factors is a shifting of the expected hook load versus measured depth line 104 to more closely match the actual measured values, as illustrated by FIG. 5.

Figure 5:
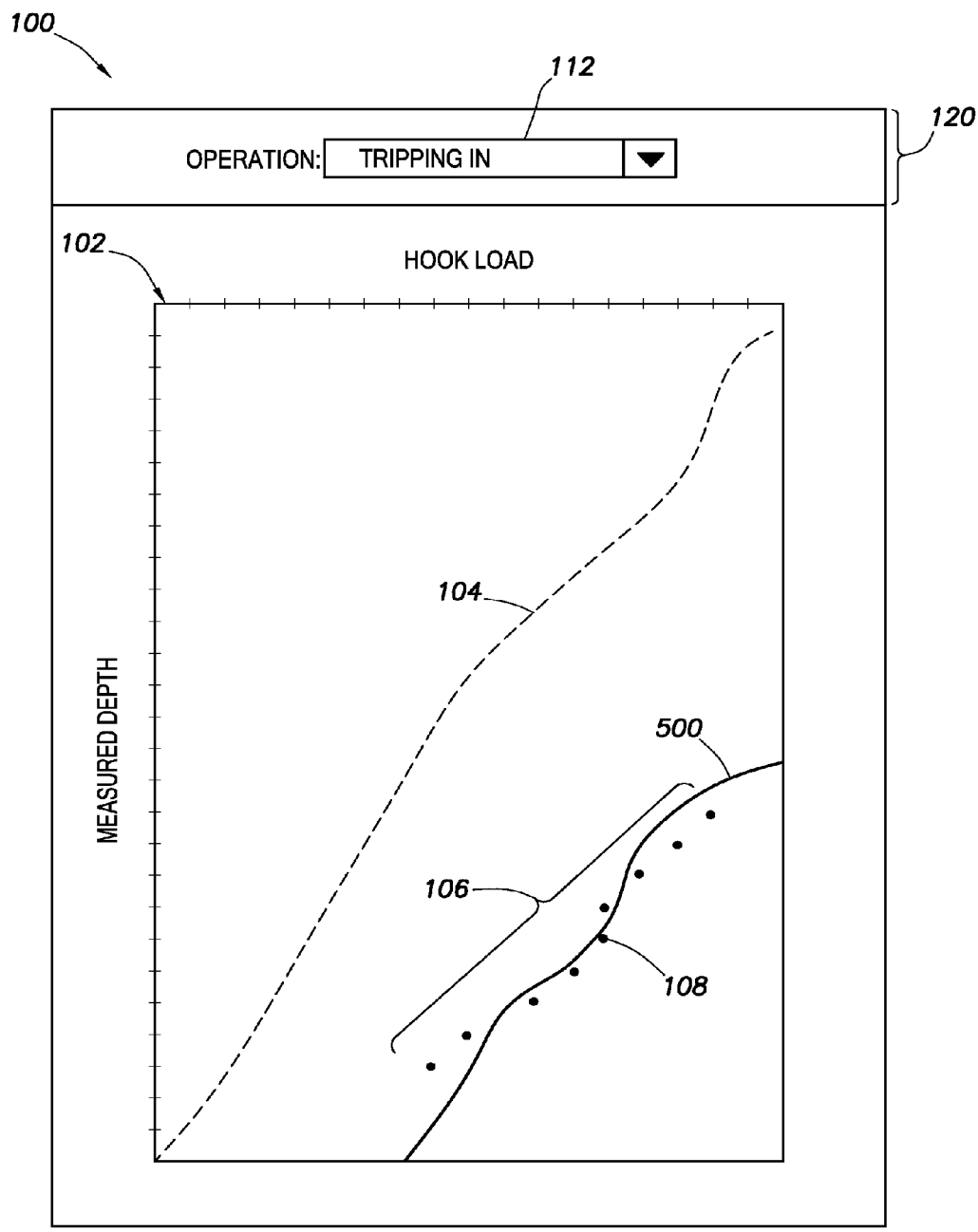
FIG. 5 shows a user interface in accordance with at least some embodiments.

FIG. 5 shows a user interface in accordance with at least some embodiments. In FIG. 5, the user has "calibrated" one or more friction factors applied to the line 104 in accordance with any of the examples discussed above. For example, the user may have selected a single point from the group of actual measured hook load versus depth values 106, the user may have selected two or more points from the group actual measured hook load versus depth values 106, or the user may have selected depth ranges extending for some or all the depths associated with the graph. Regardless, "calibrating" the friction factor(s) results in an adjusted hook load versus depth line 500 that more closely matches the actual measured hook load versus depth values 106. Although not specifically shown in FIG. 5, as the user selects a point and applies a friction factor, or selects a range as in FIG. 4, the adjusted hook load versus depth line 500 may be adjusted in a piecemeal fashion. In other words, the adjusted hook load versus depth line 500 may be created and altered with each sequent friction factor selection until the user is satisfied.

While FIG. 5 shows an adjusted hook load versus depth line 500 corresponding to friction factor calibration of the selection of multiple actual measured hook load versus depth values 106, it is possible for the user to adjust only a portion of the line by calibrating the friction factor of a desired range or any number of desired actual measured hook load versus depth values 106.

In addition to performing the methods using historical and previously calculated data, friction factor calibration may also be achieved using data received in real-time. The methods described above provide a seamless process of graphically selecting a point by way of point-and-click gestures, without which the user may have to manually enter each input after lengthy a trial and error process of individually selecting each pair of values and observing each subsequent results.

Figure 6:
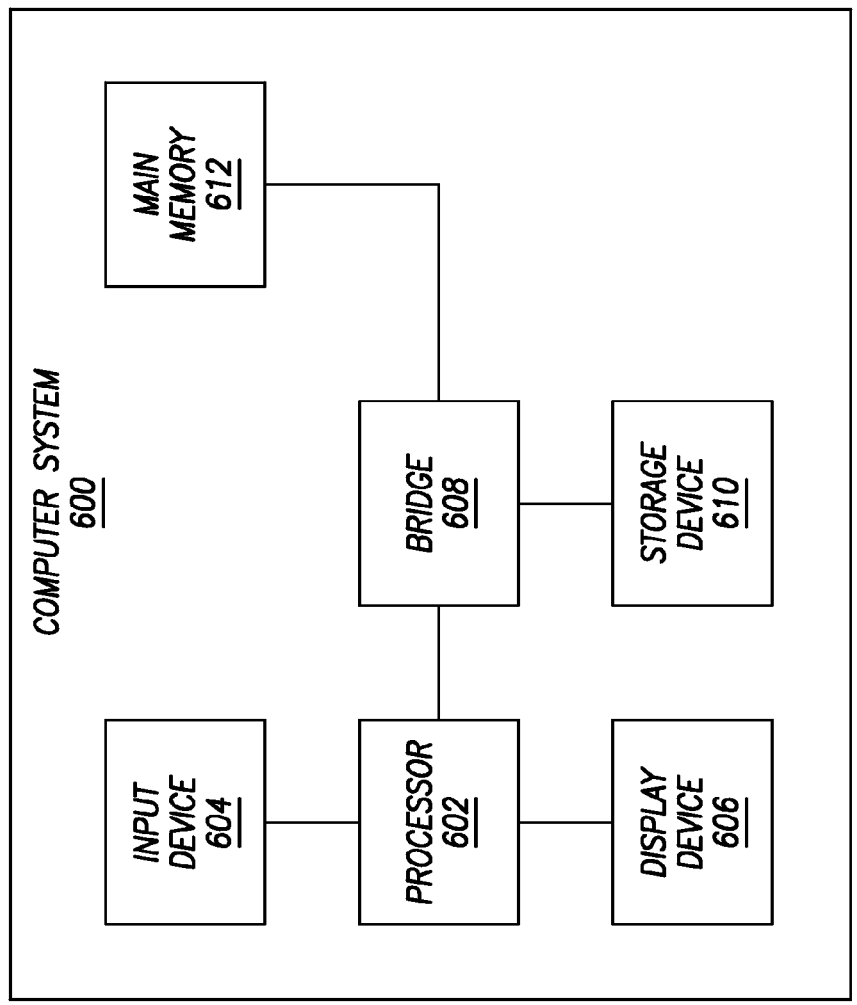
FIG. 6 shows, in block diagram form, a computer system in accordance with at least some embodiments.

FIG. 6 shows a computer system 600, which is illustrative of a computer system upon which the various embodiments may be practiced. The computer system 600 comprises a processor 602, and the processor couples to at least one input device 604, a display device 606 and a main memory 612 by way of a bridge device 608. The input device 604 may be the device by which a data point or friction factor may be selected, and may be an input device such as a keyboard or a mouse. It is on the display device 606 that friction factors and hook load and measured depth graphs may be plotted. Moreover, the processor 602 may couple to a long term storage device 610 (e.g., a hard drive, solid state disk, memory stick, optical disc) by way of the bridge device 608. Programs executable by the processor 602 may be stored on the storage device 610, and accessed when needed by the processor 602. In some cases, the programs are copied from the storage device 610 to the main memory 612, and the programs are executed from the main memory 612. Thus, the main memory 612, and storage device 610 shall be considered computer-readable storage mediums.

Figure 7:
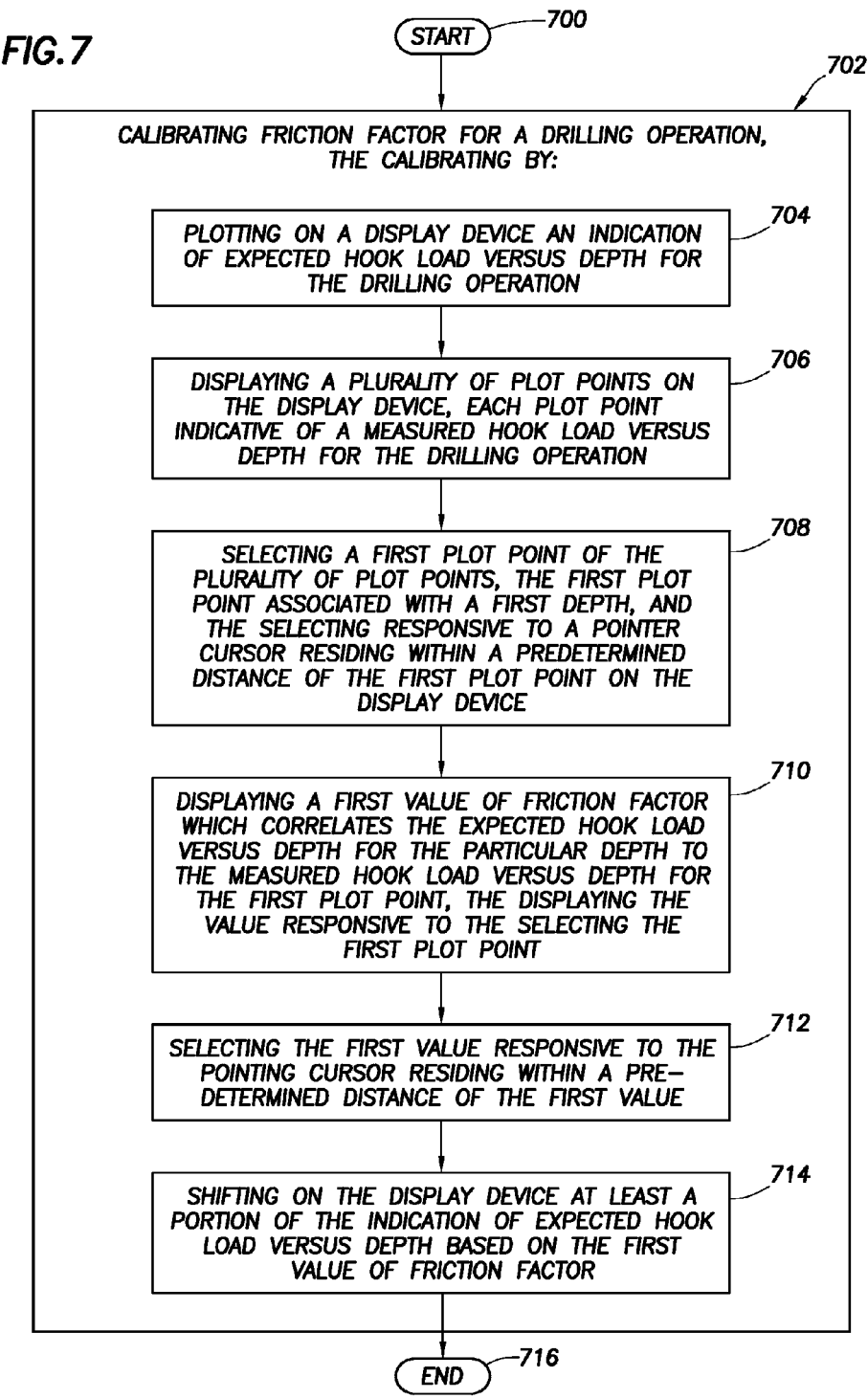
FIG. 7 shows a flow diagram depicting an overall method in accordance with at least some embodiments.

FIG. 7 shows a flow diagram depicting an overall method of performing a friction factor calibration, some of which may be performed as a program executing on a processor. The method starts (block 700), and begins with calibrating friction factor for a drilling operation (block 702). The calibrating may be by: plotting on a display device an indication of expected hook load versus depth for the drilling operation (block 704); displaying a plurality of plot points on the display device, each plot point indicative of a measured hook load versus depth for the drilling operation (block 706); selecting a first plot point of the plurality of plot points, the first plot point associated with a first depth, and the selecting responsive to a pointer cursor residing within a predetermined distance of the first plot point on the display device (block 708); displaying a first value of friction factor which correlates the expected hook load versus depth for the particular depth to the measured hook load versus depth for the first plot point, the displaying the value responsive to the selecting the first plot point (block 710); selecting the first value responsive to the pointing cursor residing within a predetermined distance of the first value (block 712); and then shifting on the display device at least a portion of the indication of expected hook load versus depth based on the first value of friction factor (block 714). Thereafter, the method ends (block 716).

At least some embodiments are methods comprising calibrating friction factor for a drilling operation, the calibrating by: plotting on a display device an indication of expected hook load versus depth for the drilling operation; displaying a plurality of plot points on the display device, each plot point indicative of a measured hook load versus depth for the drilling operation; selecting a first plot point of the plurality of plot points, the first plot point associated with a first depth, and the selecting responsive to a pointer cursor residing within a predetermined distance of the first plot point on the display device; displaying a first value of friction factor which correlates the expected hook load versus depth for the particular depth to the measured hook load versus depth for the first plot point, the displaying the value responsive to the selecting the first plot point; selecting the first value responsive to the pointing cursor residing within a predetermined distance of the first value; and then shifting on the display device at least a portion of the indication of expected hook load versus depth based on the first value of friction factor.

Other embodiments may also comprise: selecting a second plot point of the plurality of plot points, the second plot point associated with a second depth, and the selecting responsive to the pointer cursor residing within a predetermined distance of the second plot point on the display device; wherein displaying further comprises displaying a range of values of friction factor, where each value in the range of values correlates the expected hook load versus depth along a range of depths between the first depth and the second depth, the displaying the range value responsive to the selecting the first plot point; and wherein selecting the first value further comprises selecting the first value from the range of values of friction factor.

Other embodiments may also comprise selecting the first plot point residing with a first depth range;

Other embodiments may also comprise displaying a friction factor which correlates the expected hook load versus depth for the first depth range to the measured hook load versus depth for the first plot point; and wherein shifting further comprises shifting on the display device a portion of the indication of expected hook load versus depth corresponding to the first depth range based on the first value of friction factor.

Other embodiments may also comprise selecting a second plot point of the plurality of plot points, the second plot point associated with a second depth range distinct from the first depth range, and the selecting responsive to the pointer cursor residing within a predetermined distance of the second plot point on the display device; displaying a second value of friction factor which correlates the expected hook load versus depth for the second depth range to the measured hook load versus depth for the second plot point; selecting the second value responsive to the pointing cursor residing within a predetermined distance of the second value; and shifting on the display device a portion of the indication of expected hook load versus depth corresponding to the second depth range based on the second value of friction factor.

Other embodiments may also comprise calibrating the friction factor value for at least one from the group comprising: tripping in; tripping out; and rotating off bottom.

Other embodiments may be computer systems comprising a processor; a pointing device; a memory coupled to the processor; a display device coupled to the processor; wherein the memory stores a program that, when executed by the processor, causes the processor to: plot on a display device an indication of expected hook load versus depth for the drilling operation; display a plurality of plot points on the display device, each plot point indicative of a measured hook load versus depth for the drilling operation; select a first plot point of the plurality of plot points, the first plot point associated with a first depth, and the selecting responsive to a pointer cursor residing within a predetermined distance for the first plot point on the display device; display a first value of friction factor which correlates the expected hook load versus depth for the particular depth to the measured hook load versus depth for the first plot point, the displaying the value responsive to the selection the first plot point; select the first value responsive to the pointing cursor residing within a predetermined distance of the first value; and then shift on the display device at least a portion of the indication of expected hook load versus depth based on the first value of friction factor.

The program may also cause the processor to select a second plot point of the plurality of plot points, the second plot point associated with a second depth, and the selecting responsive to the pointer cursor residing within a predetermined distance of the second plot point on the device; wherein when the processor displays, the program further causes the processor to display a range of values of friction factor, where each value in the range of values correlates the expected hook load versus depth along a range of depths between the first depth and the second depth, the displaying the range value responsive to the selecting the first plot point; and wherein when the processor selects, the program further causes the processor to select the first value from the range of values of friction factor.

The program may also cause the processor to select the first plot point residing within a first depth range; wherein when the processor displays the first value of friction factor, the program further causes the processor to display a friction factor which correlates the expected hook load versus depth for the first depth range to the measured hook load versus depth for the first plot point; and wherein when the processor shifts, the program further causes the processor to shift on the display device a portion of the indication of expected hook load versus depth corresponding to the first depth range based on the first value of friction factor.

The program may also cause the processor to select a second plot point of the plurality of plot points, the second plot point associated with a second depth range distinct from the first depth range, and the selecting responsive to the pointer cursor residing within a predetermined distance of the second plot point on the display device; display a second value of friction factor which correlates the expected hook load versus depth for the second depth range to the measured hook load versus depth for the second plot point; select the second value responsive to the pointing cursor residing within a predetermined distance of the second value; and shift on the display device a portion of the indication of expected hook load versus depth corresponding to the second depth range based on the second value of friction factor.

The program may also cause the processor to select the first plot point residing within a first depth range.

Other embodiments are computer-readable mediums storing instructions that, when executed by a processor, cause the processor to receive an indication of expected hook load versus depth for a drilling operation; display the indication of expected hook load versus depth on a plot displayed on a display device; receive an indication of a plurality of plot points, each plot point indicative of a measured hook load versus depth for the drilling operation; display the indication of the plurality of plot points on the plot displayed on the display device; receive an indication of selection of a first plot point of the plurality of plot points, the first plot point associated with a first depth, and the selecting responsive to a pointer cursor residing within a predetermined distance of the first plot point on the display device; display a first value of friction factor which correlates the expected hook load versus depth for the particular depth to the measured hook load versus depth for the first plot point, the displaying the value responsive to the selecting the first plot point; receive an indication of a selection of the first value responsive to the pointing cursor residing within a predetermined distance of the first value; and then shift on the display device at least a portion of the indication of expected hook load versus depth based on the first value of friction factor.

The program may also cause the processor to select the first plot point residing within a first depth range; wherein when the processor displays the first value of friction factor, the program further causes the processor to display a friction factor which correlates the expected hook load versus depth for the first depth range to the measured hook load versus depth for the first plot point; and wherein when the processor shifts, the program further causes the processor to shift on the display device a portion of the indication of expected hook load versus depth corresponding to the first depth range based on the first value of friction factor.

The program may also cause the processor to receive an indication of selection of a second plot point of the plurality of plot points, the second plot point associated with a second depth range distinct from the first depth range, and the selecting responsive to the pointer cursor residing within a predetermined distance of the second plot point on the display device; display a second value of friction factor which correlates the expected hook load versus depth for the second depth range to the measured hook load versus depth for the second plot point; receive an indication of selection of the second value responsive to the pointing cursor residing within a predetermined distance of the second value; and shift on the display device a portion of the indication of expected hook load versus depth corresponding to the second depth range based on the second value of friction factor.

The program may also cause the processor to select the first plot point residing within a first depth range.

It is noted that while theoretically possible to perform some or all the plotting and calculating discussed above by a human using only pencil and paper, the time measurements for human-based performance of such tasks may range from man-hours to man-years, if not more. Thus, this paragraph shall serve as support for any claim limitation now existing, or later added, setting forth that the period of time to perform any task described herein less than the time required to perform the task by hand, less than half the time to perform the task by hand, and less than one quarter of the time to perform the task by hand, where "by hand" shall refer to performing the work using exclusively pencil and paper.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a non-transitory computer-readable medium (i.e., not a carrier wave) that stores a software program to implement the method aspects of the various embodiments.

References to "one embodiment," "an embodiment," "some embodiment," "various embodiments." or the like indicate that a particular element or characteristic is included in at least one embodiment of the invention. Although the phrases may appear in various places, the phrases do not necessarily refer to the same embodiment.

The above discussion is meant to be illustrative of the principles and various embodiments of the present invention. Numerous variations and modifications will become apparent to those skilled in the art once the above disclosure is fully appreciated. For example, while the various embodiments have been described in terms of calibrating friction factors by adjusting calculated friction factors with observed friction factors, this context shall not be read as a limitation as to the scope of one or more of the embodiments described—the same techniques may be used for other embodiments. It is intended that the following claims be interpreted to embrace all such variations and modifications.

The invention claimed is:

1. A method comprising:
calibrating friction factor for a drilling operation, the calibrating by:
plotting on a display device an indication of expected hook load versus depth for the drilling operation;
displaying a plurality of plot points on the display device, each plot point indicative of a measured hook load versus depth for the drilling operation;
selecting a first plot point of the plurality of plot points, the first plot point associated with a first depth, and the selecting responsive to a pointer cursor residing within a predetermined distance of the first plot point on the display device;
displaying a first value of friction factor which correlates the expected hook load versus depth for the particular depth to the measured hook load versus depth for the first plot point, the displaying of the first value responsive to the selecting of the first plot point;
selecting the first value responsive to the pointing cursor residing within a predetermined distance of the first value; and
shifting on the display device at least a portion of the indication of expected hook load versus depth based on the first value of friction factor.

2. The method of claim 1 further comprising:
selecting a second plot point of the plurality of plot points, the second plot point associated with a second depth, and the selecting responsive to the pointer cursor residing within a predetermined distance of the second plot point on the display device;
wherein displaying further comprises displaying a range of values of friction factor, where each value in the range of values correlates the expected hook load versus depth along a range of depths between the first depth and the second depth, the displaying the range value responsive to the selecting the first plot point; and
wherein selecting the first value further comprises selecting the first value from the range of values of friction factor.

3. The method of claim 1:
wherein selecting the first plot point further comprises selecting the first plot point residing with a first depth range;
wherein displaying the first value of friction factor further comprises displaying a friction factor which correlates the expected hook load versus depth for the first depth range to the measured hook load versus depth for the first plot point; and
wherein shifting further comprises shifting on the display device a portion of the indication of expected hook load versus depth corresponding to the first depth range based on the first value of friction factor.

4. The method of claim 3 further comprising:
selecting a second plot point of the plurality of plot points, the second plot point associated with a second depth range distinct from the first depth range, and the selecting responsive to the pointer cursor residing within a predetermined distance of the second plot point on the display device;
displaying a second value of friction factor which correlates the expected hook load versus depth for the second depth range to the measured hook load versus depth for the second plot point;
selecting the second value responsive to the pointing cursor residing within a predetermined distance of the second value; and shifting on the display device a portion of the indication of expected hook load versus depth corresponding to the second depth range based on the second value of friction factor.

5. The method of claim 1 wherein calibrating the friction factor further comprises calibrating the friction factor value for at least one from the group comprising: tripping in; tripping out; and rotating off bottom.

6. A computer system comprising:
a processor;
a pointing device;
a memory coupled to the processor;
a display device coupled to the processor;
wherein the memory stores a program that, when executed by the processor, causes the processor to:
plot on a display device an indication of expected hook load versus depth for the drilling operation;
display a plurality of plot points on the display device, each plot point indicative of a measured hook load versus depth for the drilling operation;
select a first plot point of the plurality of plot points, the first plot point associated with a first depth, and the selecting responsive to a pointer cursor residing within a predetermined distance for the first plot point on the display device;
display a first value of friction factor which correlates the expected hook load versus depth for the particular depth to the measured hook load versus depth for the first plot point, the displaying of the first value responsive to the selection of the first plot point;
select the first value responsive to the pointing cursor residing within a predetermined distance of the first value; and
shift on the display device at least a portion of the indication of expected hook load versus depth based on the first value of friction factor.

7. The computer system of claim 6 wherein the program further causes the processor to:
select a second plot point of the plurality of plot points, the second plot point associated with a second depth, and the selecting responsive to the pointer cursor residing within a predetermined distance of the second plot point on the device;
wherein when the processor displays, the program further causes the processor to display a range of values of friction factor, where each value in the range of values correlates the expected hook load versus depth along a range of depths between the first depth and the second depth, the displaying the range value responsive to the selecting the first plot point; and
wherein when the processor selects, the program further causes the processor to select the first value from the range of values of friction factor.

8. The computer system of claim 6:
wherein when the processor selects the first plot point, the program further causes the processor to select the first plot point residing within a first depth range;
wherein when the processor displays the first value of friction factor, the program further causes the processor to display a friction factor which correlates the expected hook load versus depth for the first depth range to the measured hook load versus depth for the first plot point; and
wherein when the processor shifts, the program further causes the processor to shift on the display device a portion of the indication of expected hook load versus depth corresponding to the first depth range based on the first value of friction factor.

9. The computer system of claim 8 wherein the program further causes the processor to:
select a second plot point of the plurality of plot points, the second plot point associated with a second depth range distinct from the first depth range, and the selecting responsive to the pointer cursor residing within a predetermined distance of the second plot point on the display device;
display a second value of friction factor which correlates the expected hook load versus depth for the second depth range to the measured hook load versus depth for the second plot point;
select the second value responsive to the pointing cursor residing within a predetermined distance of the second value; and
shift on the display device a portion of the indication of expected hook load versus depth corresponding to the second depth range based on the second value of friction factor.

10. The computer system of claim 6 wherein when the processor selects the first plot point, the program further causes the processor to select the first plot point residing within a first depth range.

11. A non-transitory computer readable medium that, when executed by a processor, causes the processor to:
receive an indication of expected hook load versus depth for a drilling operation;
display the indication of expected hook load versus depth on a plot displayed on a display device;
receive an indication of a plurality of plot points, each plot point indicative of a measured hook load versus depth for the drilling operation;
display the indication of the plurality of plot points on the plot displayed on the display device;
receive an indication of selection of a first plot point of the plurality of plot points, the first plot point associated with a first depth, and the selecting responsive to a pointer cursor residing within a predetermined distance of the first plot point on the display device;
display a first value of friction factor which correlates the expected hook load versus depth for the particular depth to the measured hook load versus depth for the first plot point, the displaying of the first value responsive to the selecting of the first plot point;
receive an indication of a selection of the first value responsive to the pointing cursor residing within a predetermined distance of the first value; and
shift on the display device at least a portion of the indication of expected hook load versus depth based on the first value of friction factor.

12. The non-transitory computer readable medium of claim 11:
wherein when the processor receives the indication of the first plot point, the program further causes the processor to select the first plot point residing within a first depth range;
wherein when the processor displays the first value of friction factor, the program further causes the processor to display a friction factor which correlates the expected hook load versus depth for the first depth range to the measured hook load versus depth for the first plot point; and
wherein when the processor shifts, the program further causes the processor to shift on the display device a portion of the indication of expected hook load versus depth corresponding to the first depth range based on the first value of friction factor.

13. The non-transitory computer-readable medium of claim 12 wherein the program further causes the processor to:
   receive an indication of selection of a second plot point of the plurality of plot points, the second plot point associated with a second depth range distinct from the first depth range, and the selecting responsive to the pointer cursor residing within a predetermined distance of the second plot point on the display device;
   display a second value of friction factor which correlates the expected hook load versus depth for the second depth range to the measured hook load versus depth for the second plot point;
   receive an indication of selection of the second value responsive to the pointing cursor residing within a predetermined distance of the second value; and
   shift on the display device a portion of the indication of expected hook load versus depth corresponding to the second depth range based on the second value of friction factor.

14. The non-transitory computer-readable medium of claim 13 wherein when the processor receives the indication of selection, the program further causes the processor to select the first plot point residing within a first depth range.

* * * * *